(12) United States Patent
Loh et al.

(10) Patent No.: US 12,556,414 B2
(45) Date of Patent: Feb. 17, 2026

(54) SYSTEMS AND METHODS FOR AUTHENTICATION USING RELATIVISTIC ZERO KNOWLEDGE PROOFS

(71) Applicant: JPMORGAN CHASE BANK, N.A., New York, NY (US)

(72) Inventors: Kevin Loh, Singapore (SG); Jefferson Chu, Singapore (SG); Kaushik Chakraborty, Singapore (SG); Charles Lim, Singapore (SG); Albert Huang, Singapore (SG); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 167 days.

(21) Appl. No.: 18/600,086

(22) Filed: Mar. 8, 2024

(65) Prior Publication Data
US 2025/0286738 A1     Sep. 11, 2025

(51) Int. Cl.
| | |
|---|---|
| *H04L 9/32* | (2006.01) |
| *H04L 9/30* | (2006.01) |
| *H04L 9/40* | (2022.01) |
| *H04W 12/06* | (2021.01) |

(52) U.S. Cl.
CPC ............. *H04L 9/3271* (2013.01); *H04L 9/30* (2013.01); *H04L 63/0853* (2013.01); *H04W 12/06* (2013.01)

(58) Field of Classification Search
None
See application file for complete search history.

(56) References Cited

U.S. PATENT DOCUMENTS

2006/0195692 A1 *   8/2006   Kuhlman .............. H04L 9/3221
                                                                                                 713/166

FOREIGN PATENT DOCUMENTS

| WO | WO-2012052664 A1 * | 4/2012 | .......... H04L 9/3271 |
| WO | WO-2021206933 A1 * | 10/2021 | .......... H04L 9/3271 |

OTHER PUBLICATIONS

International Search Report and Written Opinion of the International Searching Authority, dated Jun. 4, 2025, from corresponding International Application No. PCT/US2025/017404.

(Continued)

*Primary Examiner* — Benjamin E Lanier
(74) *Attorney, Agent, or Firm* — GREENBERG TRAURIG LLP

(57) ABSTRACT

A method may include a first verifier computer program receiving an interaction with a first prover computer program for a client that requires verification comprising an identifier for the client; generating a challenge using a public identification key; issuing the challenge to the first prover computer program and to a second prover computer program; receiving a first response from the first prover computer program and a second response from the second prover computer program; determining that the first response and the second response were received within a predetermined amount of time; determining the first response and the second response are consistent; and informing the first prover computer program that the verification was successful.

20 Claims, 4 Drawing Sheets

(56) References Cited

OTHER PUBLICATIONS

Pouriya Alikhani et al: "Experimental relativistic zero-knowledge proofs", arxiv.org, Cornell University Library, 201 Olin Library Cornell University Ithaca, NY 14853, Dec. 18, 2020.

Laude Crpeau et al: "Practical Relativistic Zero-Knowledge for NP", IACR, International Association for Cryptologic Research, vol. 20191218: 194954 Dec. 17, 2019.

* cited by examiner

SYSTEMS AND METHODS FOR AUTHENTICATION USING RELATIVISTIC ZERO KNOWLEDGE PROOFS

BACKGROUND OF THE INVENTION

1. Field of the Invention

Embodiments are generally directed to systems and methods for authentication using relativistic zero knowledge proofs.

2. Description of the Related Art

Before providing personal or financial information to a third party, it is desirable to know that the third party is not a malicious actor. Even when issued a challenge, due to the presence of multiple communication networks, it is difficult to know whether the third party is genuine, or if the third party is receiving responses to the challenge from another entity.

SUMMARY OF THE INVENTION

Systems and methods for authentication using relativistic zero knowledge proofs are disclosed. According to an embodiment, a method may include: (1) receiving, at a first verifier computer program executed by a first verifier electronic device at a first location, an interaction with a first prover computer program for a client that requires verification comprising an identifier for the client; (2) retrieving, by the first verifier computer program, a public identification key for the client using the identifier; (3) generating, by the first verifier computer program, a challenge using information from the public identification key; (4) issuing, by the first verifier computer program, the challenge to the first prover computer program; (5) instructing, by the first verifier computer program, a second verifier computer program executed by a second electronic device at a second location to issue the challenge to a second prover computer program executed by a second prover electronic device, wherein the first prover computer program may be configured to generate a first response to the challenge and mask the first response with a private identification key that was exchanged with the second prover computer program, and the second prover computer program may be configured to generate a second response to the challenge from the second verifier computer program, and to mask the second response with the private identification key, and wherein both the first verifier computer program and the second verifier computer program issue the challenges at the same time; (6) determining, by the first verifier computer program, that the first response and the second response were received within a predetermined amount of time; (7) determining, by the first verifier computer program, that the first response and the second response are consistent; and (8) informing, by the first verifier computer program, the first prover computer program that the verification was successful.

In one embodiment, the predetermined amount of time may be based on a distance between the first prover electronic device and the second prover electronic device divided by the speed of light.

In one embodiment, the private identification key may include a secret and a random string of numbers.

In one embodiment, the challenge may include a plurality of correlated challenges, wherein a first correlated challenge may include a first part to a question, and a second correlated challenge may include a second part to the question, and the first response and the second response indicate that the first prover computer program and the second prover computer program share the same knowledge.

In one embodiment, the method may also include rejecting, by the first verifier computer program, the verification in response to the first response and the second response not being received within the predetermined amount of time or a determination that the first response and the second response are inconsistent.

In one embodiment, the first prover electronic device may include a hardware device.

In one embodiment, the first verifier computer program authenticates the client before retrieving the public identification key for the client.

According to another embodiment, a non-transitory computer readable storage medium may include instructions stored thereon, which when read and executed by one or more computer processors, cause the one or more computer processors to perform steps comprising: receiving an interaction with a first prover computer program executed by a first prover electronic device for a client that requires verification comprising an identifier for the client; retrieving a public identification key for the client using the identifier; generating a challenge using information from the public identification key; issuing the challenge to the first prover computer program; instructing a second verifier computer program executed by a second electronic device at a second location to issue the challenge to a second prover computer program executed by a second prover electronic device, wherein the challenges are issued as the same time; receiving, from the first prover computer program, a first response to the challenge that may be masked with a private identification key; receiving, by from the second verifier computer program, a second response to the challenge that may be masked with the private identification key; determining that the first response and the second response were received within a predetermined amount of time; determining that the first response and the second response are consistent; and informing the first prover computer program that the verification was successful.

In one embodiment, the predetermined amount of time may be based on a distance between the first prover electronic device and the second prover electronic device divided by the speed of light.

In one embodiment, the private identification key may include a secret and a random string of numbers.

In one embodiment, the challenge may include a plurality of correlated challenges, wherein a first correlated challenge may include a first part to a question, and a second correlated challenge may include a second part to the question, and the first response and the second response indicate that the first prover computer program and the second prover computer program share the same knowledge.

In one embodiment, the non-transitory computer readable storage medium may also include instructions stored thereon, which when read and executed by one or more computer processors, cause the one or more computer processors to reject the verification in response to the first response and the second response not being received within the predetermined amount of time or a determination that the first response and the second response are inconsistent.

In one embodiment, the first prover electronic device may include a hardware device.

In one embodiment, the non-transitory computer readable storage medium may also include instructions stored thereon, which when read and executed by one or more computer processors, cause the one or more computer processors to authenticate the client before retrieving the public identification key for the client.

According to another embodiment, a system may include: a first prover electronic device at a first location executing a first prover computer program, the first prover electronic device associated with a client; a second prover electronic device at a second location executing a second prover computer program; a first verifier electronic device executing a first verifier computer program; and a second verifier electronic device executing a second verifier computer program. The first verifier computer program may be configured to receive an interaction with the first prover computer program comprising an identifier for the client; to receive a public identification key for the client using the identifier; to generate a challenge using information from the public identification key; and to instruct the second verifier computer program to issue the challenge to the second prover computer program. The first verifier computer program and the second verifier computer program are configured to issue the challenges at the same time. The first prover computer program may be configured to generate a first response to the challenge and to mask the first response with a private identification key that was exchanged with the second prover computer program. The second prover computer program may be configured to generate a second response to the challenge from the second verifier computer program, and to mask the second response with the private identification key. The first verifier computer program may be configured to determine that the first response and the second response were received within a predetermined amount of time; to determine that the first response and the second response are consistent; and to inform the first prover computer program that a verification was successful.

In one embodiment, the predetermined amount of time may be based on a distance between the first prover electronic device and the second prover electronic device divided by the speed of light.

In one embodiment, the private identification key may include a secret and a random string of numbers.

In one embodiment, the challenge may include a plurality of correlated challenges, wherein a first correlated challenge may include a first part to a question, and a second correlated challenge may include a second part to the question, and the first response and the second response indicate that the first prover computer program and the second prover computer program share the same knowledge.

In one embodiment, the first verifier computer program may be further configured to reject the verification in response to the first response and the second response not being received within the predetermined amount of time or a determination that the first response and the second response are inconsistent.

In one embodiment, the first verifier computer program may be further configured to authenticate the client before retrieving the public identification key for the client.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for authentication using relativistic zero knowledge proofs are disclosed.

Embodiments may use Zero-Knowledge Proof (ZKP) that allow a prover to prove the validity of a statement, without revealing any information about the statement. For example, embodiments may provide multiple provers, and these provers may convince a verifier of the validity of a statement. To ensure the integrity of the process, the provers are not allowed to communicate with each other. Embodiments may enforce this by applying space-time constraints. For example, the provers may be separated spatially to enforce the impossibility of communicating with each other within a short time.

Thus, the multi-prover ZKP with time-space constraints provide a quantum safe system and method.

Embodiments may be used to protect user privacy, such as with automated teller machine transactions, decentralized identity transactions, point-of-sale transactions, secure zone accesses, etc.

Figure 1:
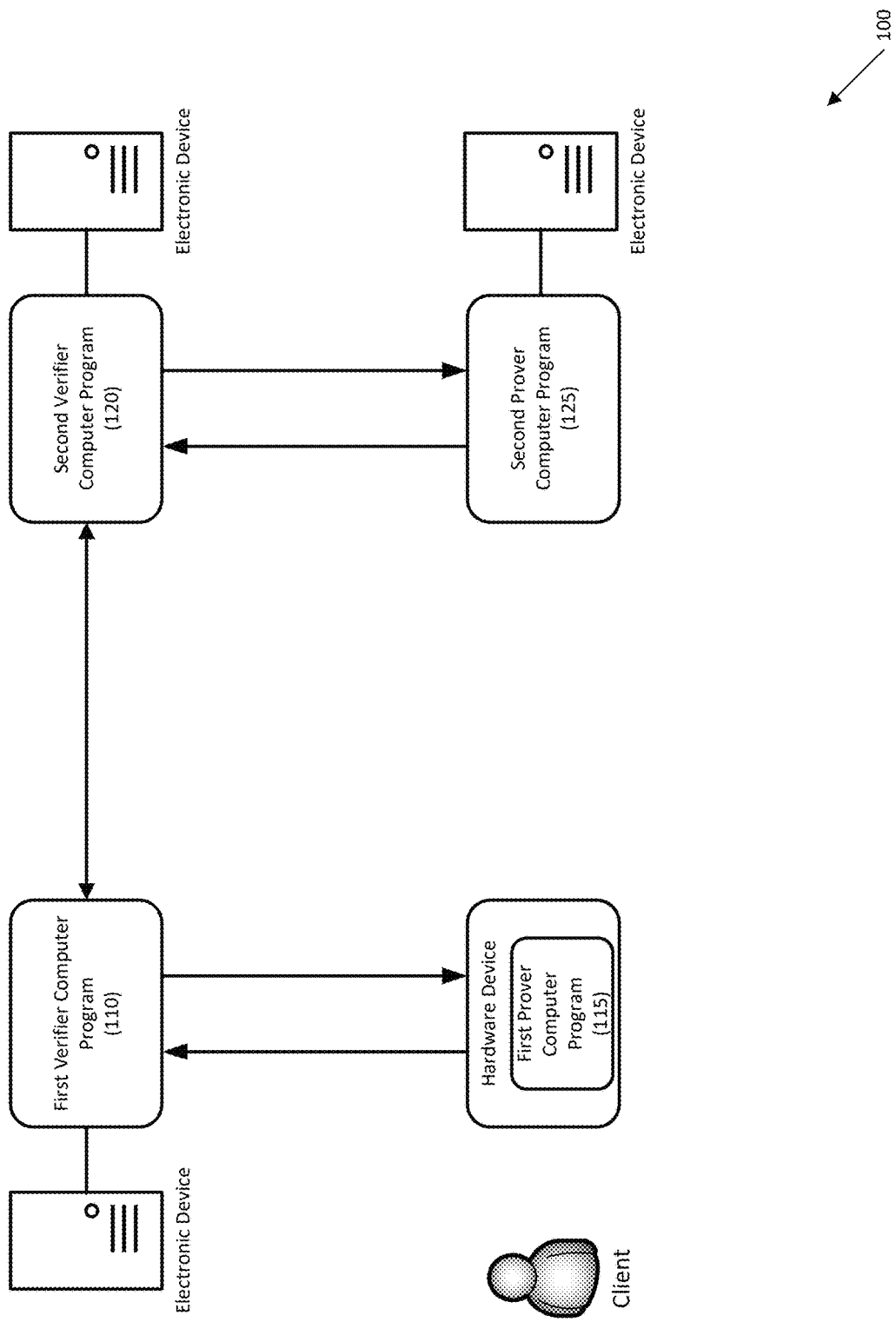
FIG. 1 depicts a system for authentication using relativistic zero knowledge proofs according to an embodiment.

Referring to FIG. 1, a system for authentication using relativistic zero knowledge proofs is disclosed according to an embodiment. System 100 may include first verifier computer program 110, first prover computer program 115, second verifier computer program 120, and second prover computer program 125. The electronic device that executes first verifier computer program 110 may be located at a first location, and the electronic devices that execute second verifier computer program 120 and second prover computer program 125 may be located at a second location.

For example, first verifier computer program 110 may be executed by a terminal, such as an automated teller machine, a point-of-sale terminal, an access control system, etc. First prover computer program 115 may be a transaction card, such as a credit card, an access card, etc., may be a person seeking to access a resource via first verifier computer program 110 (e.g., access ATM services, an area, information, etc.), may be a computer program executed by a user electronic device (e.g., a computer, a smart device, an Internet of Things appliance, etc.). First prover computer program 115 may include computational capability, such as read/write ability, as well as the ability to perform simple cryptographical computations.

Second verifier computer program 120 may be executed by, for example, a backend for the electronic device on which first verifier computer program 110 is executed. An example may be an ATM server or backend.

First prover computer program 115 may be executed by a hardware device, such as a device that includes non-volatile memories for storing client and user authentication information (e.g., a PIN, a biometric, etc.), as well as private identification keys. It may further include a processor that may receive the user authentication information to authenticate a user, may read and forward client information and provide the client information, such as the client's address, to first verifier computer program 110, and may read the private identification key and generate encrypted secrets to be used in the protocol. Because the hardware device needs to respond to first verifier computer program 110 within a small window of time, the communication medium, reading of private identification key, and generation of encrypted secrets should be low latency.

The hardware device may be associated with a client, such as an individual seeking to interact with the electronic device on which first prover computer program 115 is executed.

Second prover computer program 125 may be associated with first prover computer program 115, such as an issuer of a credit card, an access card, a mobile application, etc. and may share an identification key, such as a personal identification number (PIN) or other information that may be easily verifiable.

In one embodiment, the identification key may include a private key portion, such as a private identification key, that may include a random string and a secret known to both first prover computer program 115 and second prover computer program 125, such as a label, a number, a solution to a problem, etc. The random string may be used as a seed to a DRBG (deterministic random bit generator) on both provers for generating more random strings in a consistent manner. These generated random strings may be used to calculate an encrypted secret using an encryption function.

Other mechanisms for calculating the encrypted secret may be used as is necessary and/or desired.

The public identification key may include information that first verifier computer program 110 and second verifier computer program 120 may use to generate challenges to first prover computer program 115 and second prover computer program 125. For example, in the 3-coloring problem, the public information key may include the uncolored graph, and first verifier computer program 110 and second verifier computer program 120 may use that information to identify the graph edges that may be used to generate challenges.

In one embodiment, the public identification keys may be stored in a public database and may be associated with an address or identifier for first prover computer program 115. Before starting the process, first prover computer program 115 may provide its address or identifier to first verifier computer program 110 and second verifier computer program 120. For example, first verifier computer program 110 may provide the address or identifier to second verifier computer program 120. First verifier computer program 110 and second verifier computer program 120 may use the client address to retrieve the client's public identification key from the database.

First prover computer program 115 and the electronic device that executes second prover computer program 125 may be located a distance D apart, and this distance is known. For example, if first prover computer program 115 is a credit card that is attempting to use first verifier computer program 110, the location of the electronic device that is executing first verifier computer program 110 may be used as the location of first prover computer program 115. In another embodiment, a location of an electronic device associated with first prover computer program 115 may be used for the location of first prover computer program 115.

Using first prover computer program 115, the client may initiate an interaction with first verifier computer program 110. For example, the client may insert or present the hardware device that executes first prover computer program 115 into the electronic device that executes first verifier computer program 110, and may enter an identifier, such as a personal identification number. This security step prevents a malicious party from authenticating transactions if he/she acquires the client's hardware token.

After client is identified successfully with the PIN or other identifier, the client information data stored in the hardware token may be used by first verifier computer program 110 and second verifier computer program 120 to retrieve the public identification key.

First verifier computer program 110 may present a challenge to first prover computer program 115. The challenge presented may be based on a secret that both first prover computer program 115 and second prover computer program 125 know, such as a label, a number, a solution to a problem, etc. from the public identification key. First prover computer program 115 may provide a first identifier, such as a first encrypted secret based on the private identification key, in response to the challenge with a first time $t_1$. The first time $t_1$ may be timestamped.

In one embodiment, at the same time, second verifier computer program 120 may issue the same challenge, or a correlated challenge, to second prover computer program 125. For example, first prover computer program 115 and second prover computer program 125 may receive parts of the same question. When the responses are combined, first verifier computer program 110 and second verifier computer program 120 may determine whether first prover computer program 115 and second prover computer program 125 share the same knowledge.

Second prover computer program 125, using the private identification key, may respond to the challenge with a second identifier, such as a second encrypted secret, within a second time $t_2$. The second time $t_2$ may also be time stamped.

Second verifier computer program 120 may provide the second identifier and the second time $t_2$ to first verifier computer program 110, which may confirm that the first identifier and the second identifier match. It may further confirm that both $t_1$ and $t_2$ are less than a predetermined amount of time that would be required for a communication to occur between first prover computer program 115 and second prover computer program 125, T. T may be based on the distance between the hard device executing first prover computer program 115 (or the electronic device executing first prover computer program 115, as they may be collocated), and second prover computer program 125 divided by the speed at which an electronic communication between the two can occur, which is approximately the speed of light.

If $t_1$ and $t_2$ are less than T, communication between first prover computer program 115 and second prover computer program 125 could not occur, and the verification is complete. If $t_1$ and $t_2$ are greater than T, then it is possible that first prover computer program 115 and second prover computer program 125 did communicate, and the process may be repeated.

In one embodiment, first verifier computer program 110 may also send the first identifier to second verifier computer program 120, and second verifier computer program 120 may perform the same verification. If either verification fails, the process may be considered to fail.

Figure 2A:
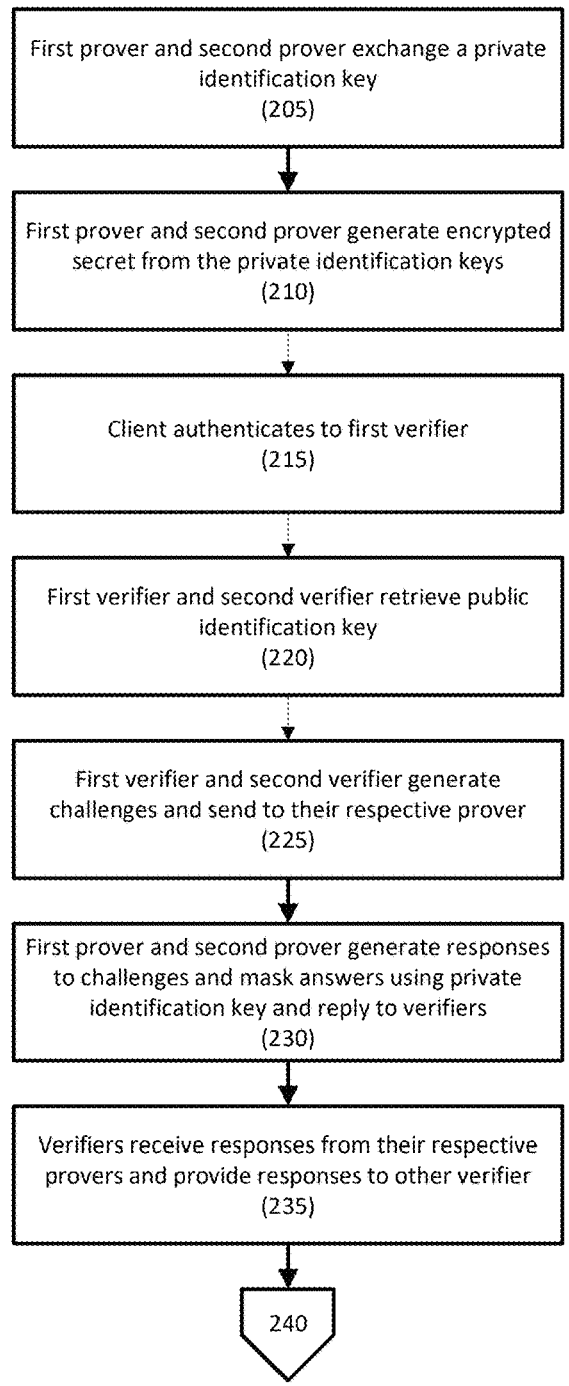
FIGS. 2A and 2B depict a method for authentication using relativistic zero knowledge proofs according to an embodiment.
Figure 2B:
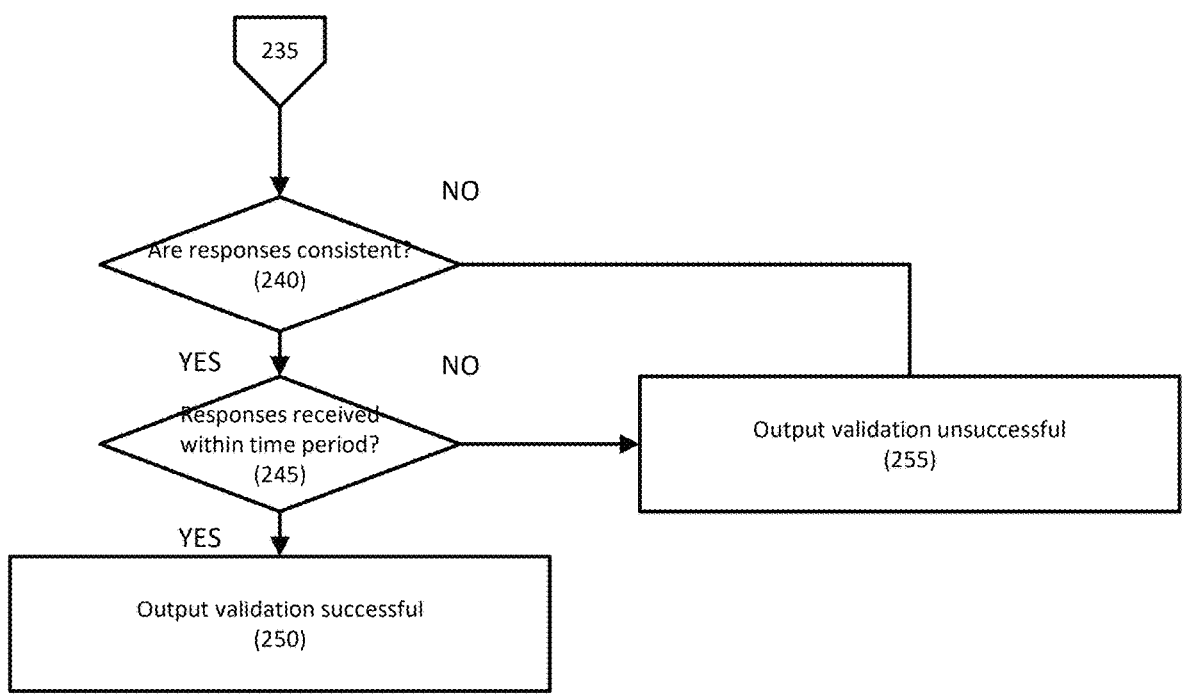

Referring to FIGS. 2A and 2B, a method for authentication using relativistic zero knowledge proofs is disclosed according to an embodiment.

In step 205, a first prover and second prover may exchange private information, such as a private identification key. The private identification key may be, for example, a secret, or any other information that may be easily verifiable.

The private identification key may also include a random string.

In step 210, the first prover and the second prover may generate an encrypted secret from the information within the private identification key. For example, the random string in the private identification key may be used to calculate the encrypted secret.

In step 215, a client may authenticate to the first verifier. For example, a client may present a hardware device executing the first prover to the electronic device that is executing the first verifier, and may insert a personal identification number or similar. Once authenticated, the first prover may provide a client address or identifier to the first verifier. The first verifier may provide the client address or identifier to a second verifier.

In step 220, using the client address or identifier, the first verifier and a second verifier may retrieve a public identification key for the client. The public identification key may be stored in a public database.

In step 225, using information in the public identification key, the first verifier may generate a challenge and may communicate that challenge to the first prover. In one embodiment, the first verifier may instruct a second verifier to issue the same challenge to the second prover. In another embodiment, the first verifier may instruct the second verifier to issue a correlated challenge to the second prover.

The first verifier and the second verifier may issue the challenge or correlated challenge to their respective provers at the same time.

For example, for a 3-colorable problem, the nodes in the challenge and correlated challenge may be elected from the edges specifically from the client's graph. The public information key contains the client's uncolored graph. Upon retrieving the public information key, the verifiers use the edges from the uncolored graph to generate the challenge and correlated challenge.

In step 230, the first prover and the second prover may generate responses to the challenges, and may mask or encrypt their responses with the private identification key. They may then provide their responses to their respective verifiers.

In one embodiment, masking may be used to hide the value of the responses. Thus, the verifiers may be able to check for consistency even if the responses are masked, and the verifiers will not be able to glean the true value of the responses, but will be able to confirm that the responses are consistent and that the provers share the same knowledge.

For example, in a 3-color graph, if the first prover is issued a challenge to provide the label of node 1 and node 3, and prover 2 is issued a correlated challenge to provide the label of node 1 and node 4, the verifiers will only check if the label of node 1 matches.

In step 235, the first verifier and the second verifier may receive the responses from their respective provers, and may mark the time that it took for the response to be received. For example, the first verifier may mark the time for the first prover to respond as a first time, and the second verifier may mark the time for the second prover to respond as the second time.

The first verifier and the second verifier may provide the responses received from their respective provers to the other verifier.

In step 240, the verifiers may review the responses to see if they are consistent. If either verifier determines that the responses are inconsistent (e.g., do not match), the process may fail.

In step 245, the verifiers may determine whether the time for their respective responses to be received were less than a certain time, such as the time it would take for the provers to communicate based on the known distance between the provers. If the time is less than the certain time, then in step 250, the verification is complete. If the time is longer than the certain time, in step 255, the verification may be unsuccessful as it is possible that the provers communicated. The process may be repeated if desired.

Figure 3:
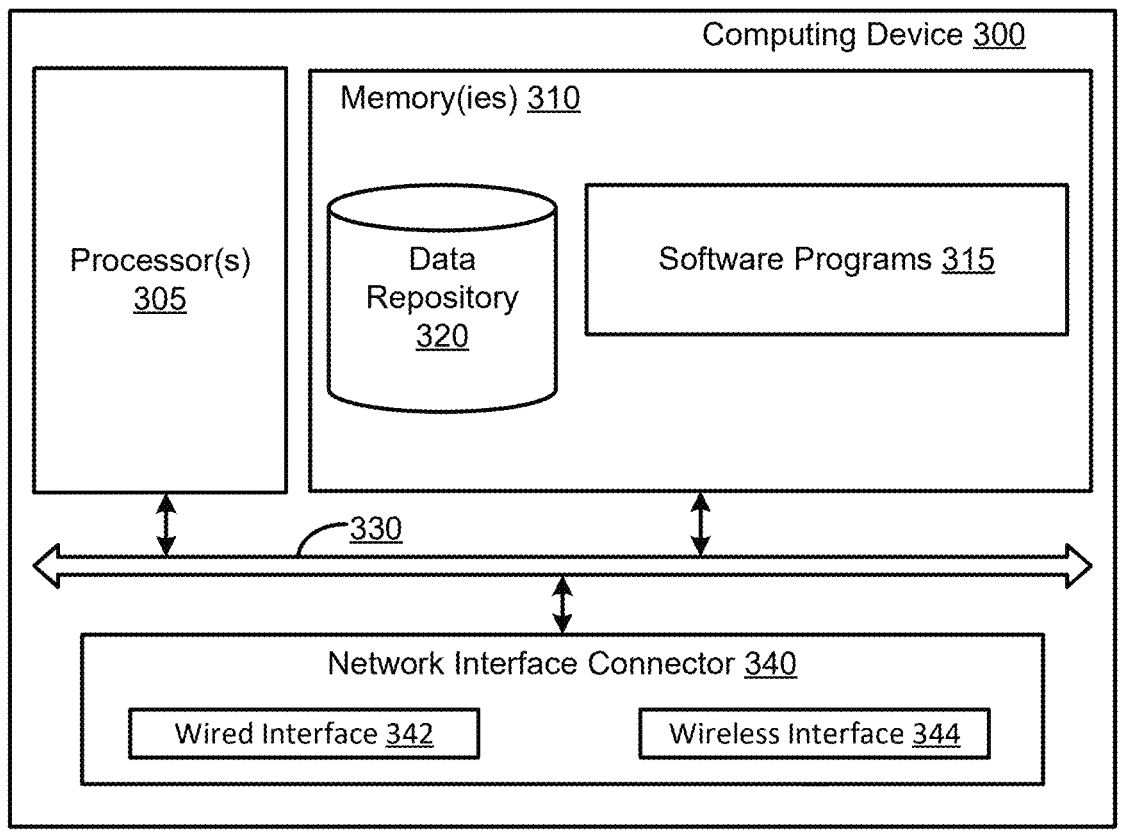
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
    receiving, at a first verifier computer program executed by a first verifier electronic device at a first location, an interaction with a first prover computer program for a client that requires verification comprising an identifier for the client;
    retrieving, by the first verifier computer program, a public identification key for the client using the identifier;
    generating, by the first verifier computer program, a challenge using information from the public identification key;
    issuing, by the first verifier computer program, the challenge to the first prover computer program;
    instructing, by the first verifier computer program, a second verifier computer program executed by a second electronic device at a second location to issue the challenge to a second prover computer program executed by a second prover electronic device, wherein the first prover computer program is configured to generate a first response to the challenge and mask the first response with a private identification key that was exchanged with the second prover computer program, and the second prover computer program is configured to generate a second response to the challenge from the second verifier computer program, and to mask the second response with the private identification key, and wherein both the first verifier computer program and the second verifier computer program issue the challenges at the same time;
    determining, by the first verifier computer program, that the first response and the second response were received within a predetermined amount of time;
    determining, by the first verifier computer program, that the first response and the second response are consistent; and
    informing, by the first verifier computer program, the first prover computer program that the verification was successful.

2. The method of claim 1, wherein the predetermined amount of time is based on a distance between the first prover electronic device and the second prover electronic device divided by the speed of light.

3. The method of claim 1, wherein the private identification key comprises a secret and a random string of numbers.

4. The method of claim 1, wherein the challenge comprises a plurality of correlated challenges, wherein a first correlated challenge comprises a first part to a question, and a second correlated challenge comprises a second part to the question, and the first response and the second response indicate that the first prover computer program and the second prover computer program share the same knowledge.

5. The method of claim 1, further comprising:
    rejecting, by the first verifier computer program, the verification in response to the first response and the second response not being received within the predetermined amount of time or a determination that the first response and the second response are inconsistent.

6. The method of claim 1, wherein the first prover electronic device comprises a hardware device.

7. The method of claim 1, wherein the first verifier computer program authenticates the client before retrieving the public identification key for the client.

8. A non-transitory computer readable storage medium, including instructions stored thereon, which when read and executed by one or more computer processors, cause the one or more computer processors to perform steps comprising:
    receiving an interaction with a first prover computer program executed by a first prover electronic device for a client that requires verification comprising an identifier for the client;
    retrieving a public identification key for the client using the identifier;
    generating a challenge using information from the public identification key;
    issuing the challenge to the first prover computer program;
    instructing a second verifier computer program executed by a second electronic device at a second location to issue the challenge to a second prover computer program executed by a second prover electronic device, wherein the challenges are issued at the same time;
    receiving, from the first prover computer program, a first response to the challenge that is masked with a private identification key;
    receiving, by from the second verifier computer program, a second response to the challenge that is masked with the private identification key;
    determining that the first response and the second response were received within a predetermined amount of time;
    determining that the first response and the second response are consistent; and
    informing the first prover computer program that the verification was successful.

9. The non-transitory computer readable storage medium of claim 8, wherein the predetermined amount of time is based on a distance between the first prover electronic device and the second prover electronic device divided by the speed of light.

10. The non-transitory computer readable storage medium of claim 8, wherein the private identification key comprises a secret and a random string of numbers.

11. The non-transitory computer readable storage medium of claim 8, wherein the challenge comprises a plurality of correlated challenges, wherein a first correlated challenge comprises a first part to a question, and a second correlated challenge comprises a second part to the question, and the first response and the second response indicate that the first prover computer program and the second prover computer program share the same knowledge.

12. The non-transitory computer readable storage medium of claim 8, further comprising instructions stored thereon, which when read and executed by one or more computer processors, cause the one or more computer processors to reject the verification in response to the first response and the second response not being received within the predetermined amount of time or a determination that the first response and the second response are inconsistent.

13. The non-transitory computer readable storage medium of claim 8, wherein the first prover electronic device comprises a hardware device.

14. The non-transitory computer readable storage medium of claim 8, further comprising instructions stored thereon, which when read and executed by one or more computer processors, cause the one or more computer processors to authenticate the client before retrieving the public identification key for the client.

15. A system, comprising:
a first prover electronic device at a first location executing a first prover computer program, the first prover electronic device associated with a client;
a second prover electronic device at a second location executing a second prover computer program;
a first verifier electronic device executing a first verifier computer program; and
a second verifier electronic device executing a second verifier computer program;
wherein:
the first verifier computer program is configured to receive an interaction with the first prover computer program comprising an identifier for the client;
the first verifier computer program is configured to receive a public identification key for the client using the identifier;
the first verifier computer program is configured to generate a challenge using information from the public identification key;
the first verifier computer program is configured to instruct the second verifier computer program to issue the challenge to the second prover computer program;
the first verifier computer program and the second verifier computer program are configured to issue the challenges at the same time;
the first prover computer program is configured to generate a first response to the challenge and to mask the first response with a private identification key that was exchanged with the second prover computer program;
the second prover computer program is configured to generate a second response to the challenge from the second verifier computer program, and to mask the second response with the private identification key;
the first verifier computer program is configured to determine that the first response and the second response were received within a predetermined amount of time;
the first verifier computer program is configured to determine that the first response and the second response are consistent; and
the first verifier computer program is configured to inform the first prover computer program that a verification was successful.

16. The system of claim 15, wherein the predetermined amount of time is based on a distance between the first prover electronic device and the second prover electronic device divided by the speed of light.

17. The system of claim 15, wherein the private identification key comprises a secret and a random string of numbers.

18. The system of claim 15, wherein the challenge comprises a plurality of correlated challenges, wherein a first correlated challenge comprises a first part to a question, and a second correlated challenge comprises a second part to the question, and the first response and the second response indicate that the first prover computer program and the second prover computer program share the same knowledge.

19. The system of claim 15, wherein the first verifier computer program is further configured to reject the verification in response to the first response and the second response not being received within the predetermined amount of time or a determination that the first response and the second response are inconsistent.

20. The system of claim 15, the first verifier computer program is further configured to authenticate the client before retrieving the public identification key for the client.

* * * * *